Figure 1:
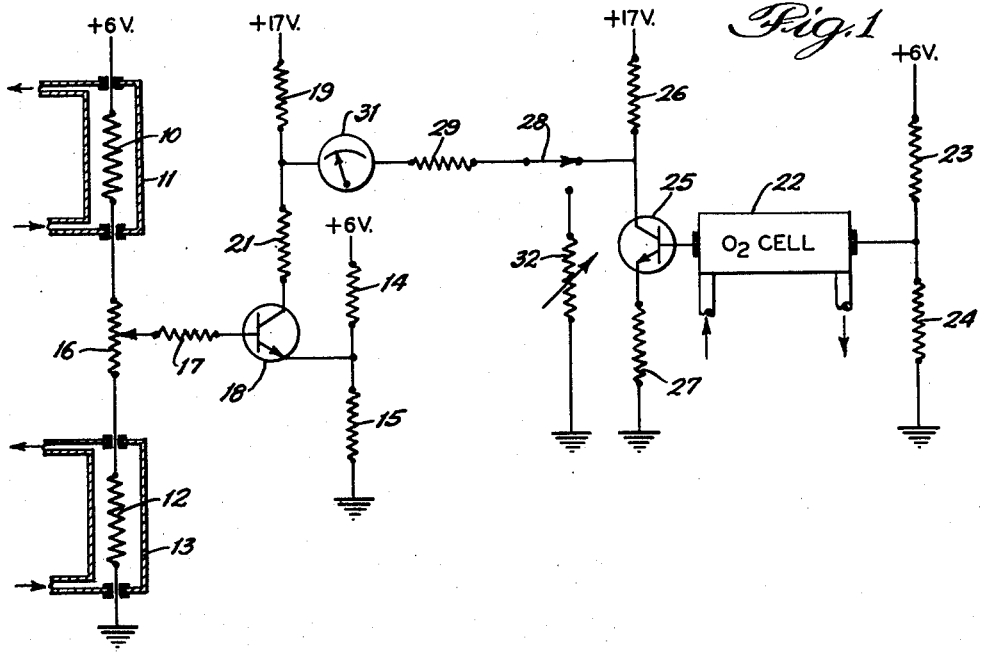

June 8, 1965    M. E. COX    3,187,559
COMBUSTION GAS ANALYZER
Filed Jan. 22, 1962

INVENTOR:
Marvin E. Cox,
BY
Burn Freeman & Molinare
ATTORNEYS.

United States Patent Office 3,187,559
Patented June 8, 1965

3,187,559
COMBUSTION GAS ANALYZER
Marvin E. Cox, Oak Lawn, Ill., assignor to Sun Electric Corporation, Chicago, Ill., a corporation of Illinois
Filed Jan. 22, 1962, Ser. No. 167,761
5 Claims. (Cl. 73—27)

This invention relates to combustion gas analyzers and more particularly to electrical apparatus for continuously indicating, by the analysis of the products of combustion, the ratio of air to fuel of the mixture prior to combustion.

The determination of the ratio of oxygen to fuel consumed is of great importance in checking the operation of various types of fuel consuming devices, such as internal combustion engines, jet engines, furnaces and the like. Heretofore the methods of determining this ratio have been either incomplete, slow in action, costly to perform or interfere with the flows of fuel and air. For example, absorption devices such as chemical cartridges or Orsat apparatus are slow and give only one shot or batch type readings. Meters to measure the inflow of fuel and air interfere with the flows, and further cannot be continously adjusted to compensate for changes in combustion of the fuel. Individual oxygen cells give incomplete results and spectrographs or spectrometers are very expensive and require subsequent computations to convert the data obtained to usable form. One system which has found considerable acceptance is a thermal conductivity Wheatstone bridge which gives an indication of the percentage of carbon dioxide and hydrogen in the combusted gas. Not only is this system incomplete, but it is relatively insensitive near the stoichiometric combustion point and does not indicate clearly whether the mixture is too rich or too lean.

It is accordingly an object of the present invention to provide a combustion gas analyzer which indicates the air-fuel ratio directly, continuously, rapidly and accurately over a full range of mixtures.

Another object is to provide a combustion gas analyzer in which the percentages of carbon dioxide, hydrogen and oxygen are obtained in the form of electrical voltages which are combined to give a continuous indication of the fuel-air ratio.

According to a feature of the invention the difference between the percentage of carbon dioxide and hydrogen is obtained by a thermal conductivity Wheatstone bridge in the form of one voltage, the percentage of oxygen is obtained by an oxygen cell in the form of a second voltage, and the voltages are combined in a differential amplifier to indicate the arithmetic difference therebetween which is equal to the percentage of carbon dioxide minus the percentage of hydrogen plus the percentage of oxygen.

Figure 2:
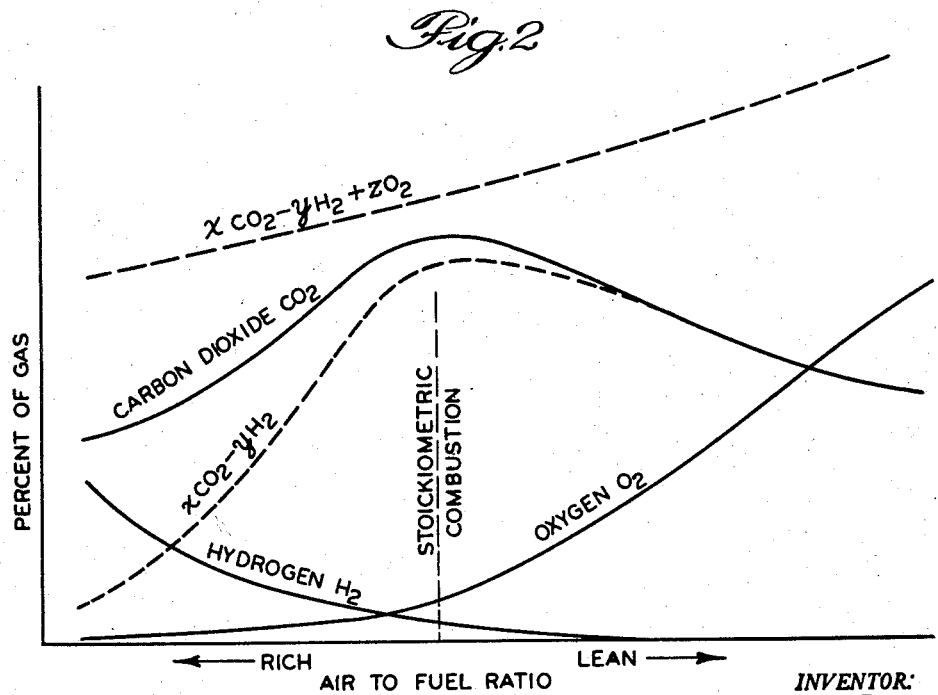

The above and other objects and features of the invention will be more readily apparent from the following description when read in connection with the accompanying drawing in which:

FIGURE 1 is a circuit diagram of a combustion gas analyzer embodying the invention; and FIGURE 2 is a graph illustrating the operation.

As shown in FIGURE 1, the entire apparatus is electrical embodying a thermal conductivity Wheatstone bridge to obtain a measurement of the difference between carbon dioxide and hydrogen and an oxygen cell to obtain an indication of the percentage of oxygen present in the combustion gas. The Wheatstone bridge comprises a resistor 10 enclosed within a casing or tube 11 through which the combustion gases to be measured are continuously circulated. The resistor 10 is formed of a temperature sensitive material so that its resistance will change in response to the thermal conductivity of the gas circulating through the tube or casing, the gas being pre-cooled to a degree lower than the normal operating temperature of the resistor. A second resistor 12, identical to the resistor 10, is enclosed in a casing or tube 13 and air is circulated through the tube 13. The bridge is completed by a pair of fixed resistors 14 and 15 with a common cross connection, including a calibrating potentiometer 16, a resistor 17 and a transistor 18 as shown.

With the combustion gas circulating through the tube 11 and air circulating through the tube 13, it has been found that the cooling effect produced by the circulating gases is dependent on the thermal conductivities of the gases rather than on their specific temperatures. Since exhaust gas produced by a gasoline-air ratio of 13.3 to 1 has the same conductivity as air, the resistors 10 and 12 will be at the same temperatures. Exhaust gas from a leaner mixture will have a lesser thermal conductivity than air while that from a richer mixture will have a greater thermal conductivity and a greater cooling effect than that of air. Therefore, in operation of the unit the thermal conductivity of the exhaust gases is always compared with the thermal conductivity of air.

As is known in the art, this will produce an output current through the bridge proportional to the percentage of carbon dioxide in the combusted gas minus the percentage of hydrogen. This current is impressed on the control electrode of the transistor 18 to vary the conductivity of the transistor, thereby to vary the current flow in a voltage divider including two resistors 19 and 21 in series. The voltage at the point between the two resistors 19 and 21 which with the transistor 18 form a part of a differential amplifier circuit will therefore be proportional at all times to the percentage of carbon dioxide in the combusted gas minus the percentage of hydrogen.

The oxygen in the combusted gas is measured in an oxygen cell indicated at 22 through which the combusted gas is circulated. This cell is preferably of the type containing a platinum electrode and a silver electrode immersed in a potassium chloride solution with the platinum electrode covered by a plastic membrane which passes oxygen but does not pass other gases of a type commonly available on the market and manufactured, for example, by Beckman Instrument Co. Cells of this type vary the resistance therethrough in proportion to the percentage of oxygen in the gas circulating through the cell.

The cell is connected to the mid point of a voltage divider including resistors 23 and 24 and to the control electrode of a transistor 25. The transistor 25 is connected through a resistor 26 to a source of the same voltage as that connected to the resistor 17 and through a second resistor 27 to ground. The point between the resistor 26 and the transistor 25 may be connected through a switch 28 through a resistor 29 and a millimeter 31 to the mid point between the resistors 19 and 21. This circuitry completes the differential amplifier circuit referred to above with the milliammeter 31 measuring the difference between the voltages at the mid point between resistors 19 and 21 and at the mid point between resistor 26 and transistor 25.

At a rich air-fuel ratio of about 12.6 parts air to one part fuel, the percentage of hydrogen in the exhaust gas, which contributes cooling to resistor 10 is relatively high, and the percentage of carbon dioxide is relatively low. Both the hydrogen and carbon dioxide in the exhaust sample pass over resistor 10 causing relative cooling of resistor 10 compared to resistor 12 which is constantly exposed to atmospheric air and maintains a constant resistance throughout testing. The cooling of resistor 10 compared to resistor 12 reduces the resistance of 10 compared to 12 causing the voltage at 17 to go up. This will cause electrical valve 18 to conduct heavily through resistors 21 and 19. The voltage at the junction of resistors 21 and 19, therefore, goes down. Meanwhile oxygen cell 22 senses no oxygen in the exhaust atmosphere and the ionic conductivity of the cell is minimum, resulting in resistor 27, electrical valve 25 and resistor 26 simulating a fixed voltage divider. Since the junction of resistors 21 and 19 has a lower voltage than the junction of resistors 26 and electrical valve 25, the unbalanced voltage condition is detected by meter 31.

At an air-fuel ratio of about 13.3 to 1, the thermal conductivity of the exhaust constituents, carbon dioxide and hydrogen, flowing across resistor 10 is the same as the thermal conductivity of air exposed to resistor 12 resulting in no unbalance of voltage across the bridge formed by resistors 10, 16 and 12. Since the voltage sensed by resistor 17 is lower than it was in the case of a 12.6 to 1 air-fuel sample, the electrical valve 18 does not conduct as heavily resulting in a higher voltage at the junction of resistors 19 and 21. Under the influence of this 13.3 to 1 exhaust sample the concentration of oxygen is minute and does not effect the fixed voltage divider consisting of resistors 27 and 26 and electrical valve 25. The diminished unbalanced voltage at the junction of resistors 19 and 21 is detected by meter 31.

At a rich air-fuel ratio of about 14 to 1 the thermal conductivity of the exhaust constituents is less than that of air resulting in a higher resistance of resistor 10 than resistor 12. Wtih a lower voltage sensed by resistor 17, the electrical valve 18 conducts less heavily than in the previous description. The oxygen content at 14 to 1 is still negligible resulting in a quiescent state of a fixed voltage between resistor 26 and electrical valve 25. A comparison is made by the detecting meter 31 of the junction of resistors 19 and 21 with the voltage at the lower end of resistor 26 and is indicated by meter 31.

At a stoichiometric air-fuel ratio of about 14.8 to 1 the concentration of carbon dioxide is maximum and the concentration of hydrogen is negligibly low, resulting in a minimum thermal conductivity of the exhaust sample due to the constituents. The minimal cooling results in maximum resistance of resistor 10 compared to resistor 12 which has maintained a constant resistance through testing due to constant exposure to the atmosphere. The high resistance of resistor 10 compared to resistor 12 is sensed through resistor 17 by valve 18 which conducts less heavily than in all previous cases. The concentration of oxygen in the exhaust sample at the stoichiometric air-fuel ratio of theoretical optimum combustion is of a low but significant value and alter the circuit characteristic of electrical valve 25 and its associated circuitry. With a detectable concentration of oxygen the ionic conductivity within the oxygen sensor changes the transconductance of electrical valve 25 from its quiescent state to a conducting mode resulting in the voltage at the junction of valve 25 and resistor 26 lowering in value slightly. Meter 31 senses the absolute value of voltage difference between the junction of valve 23 and resistor 26 on one leg, and the junction of resistor 19 and 21 on the other leg.

At a lean ratio of approximately 15.5 parts of air to one part of fuel, the percentage of hydrogen present in the exhaust sample is negligible and the concentration of carbon dioxide is somewhat diminished from the peak value at the stoichiometric air-fuel ratio resulting in slightly better cooling of resistor 10 compared to resistor 12 and a consequent slight decrease in voltage at the junction of resistors 21 and 19. At lean air-fuel ratios above stoichiometric the percentage of oxygen in the exhaust is on the increase resulting in greater ionic conductivity in the oxygen sensor and greater conductivity of electrical valve 25 and corresponding reduction of voltage at the junction between valve 25 and resistor 26. The slight increase in voltage at resistors 21 and 19 is coincident wtih a large decrease in voltage at the junction of resistor 26 and electrical valve 25 with the net resultant being a differential voltage between the two points detected by meter 31.

As a result of the operation described above the voltage at the junction of resistors 19 and 21 will follow a curve substantially similar to the dotted line curve $$xCO_2 - yH_2$$

The voltage at the juncture of resistor 26 and transistor 25 will follow a curve similar to the $O_2$ curve inverted; that is generally horizontal from the rich side to about the stoichiometric point and then falling off sharply. The difference between these two curves is indicated by the meter 31.

The switch 28 may be switched to a second position to connect the milliammeter 31 and resistor 29 to ground through a calibrating resistor 32, thereby to cut the oxygen cell out of the circuit and to enable the bridge circuit to be calibrated.

The operation of the apparatus will be best understood by reference to the graph, FIGURE 2, illustrating the percentages of different gaseous components in richer and leaner mixtures of combusted gas. As illustrated, the percentage of free oxygen remains very low and almost constant until the stoichiometric point is reached after which it rises quite rapidly. The percentage of hydrogen is highest in an extremely rich mixture and gradually reduces until it reaches zero at the lean side of the stoichiometric point. The percentage of carbon dioxide gradually increases to the stoichiometric point and then gradually decreases. The difference between the carbon dioxide percentage and hydrogen percentage as indicated by the lower dotted line follows in general the shape of the carbon dioxide curve in that it peaks at about the stoichiometric point and decreases on both sides thereof. It is therefore apparent that with only this reading as heretofore obtained by thermal conductivity Wheatstone bridges the entire story is not told and further that it cannot be determined whether the mixture is too rich or too lean.

By combing a voltage proportional to the percentage of oxygen with the output voltage of the bridge according to the present invention, an operating curve is achieved as indicated by the top dot-dash line which gradually rises from the rich end of the range to the lean end of the range. The value of this curve is proportional to the function $CO_2 - H_2 + O_2$ as indicated and will, throughout the full range of mixture values, give an extremely accurate indication of the richness or leanness of the initial mixture. With this indication, it is a relatively simple matter to adjust the combustion ratio whether in an internal combustion engine carburetor, a jet engine or a fuel burning device such as a furnace to achieve complete combustion and maximum efficiency.

While one embodiment of the invention has been shown and described in detail, it will be understood that this is illustrative only and is not to be taken as a definition of the scope of the invention, reference being had for this purpose to the appended claims.

What is claimed is:

1. A combustion gas analyzer comprising a first means to produce a voltage proportional to the difference in percentages of carbon dioxide and hydrogen in a combustion gas to be analyzed, a second means to produce a voltage proportional to the percentage of oxygen in the combustion gas, and a meter connected between the first and second means continuously to indicate the difference between said voltages.

2. A combustion gas analyzer comprising a first means to produce a voltage proportional to the difference in percentages of carbon dioxide and hydrogen in a combustion gas, a pair of electrical values each connected in a voltage proportional to the percentage of oxygen in the combustion gas, a differential amplifier circuit having two input terminals connected respectively to the first and second means to produce an output proportional to the difference between said voltages, and a meter connected to the amplifier circuit continuously to indicate the value of the output.

3. A combustion gas analyzer comprising a first means to produce a voltage proportional to the difference in percentages of carbon dioxide and hydrogen in a combustion gas to be analyzed, a second means to produce a voltage proportional to the percentage of oxygen in the combustion gas, a pair of electrical valves each connected in a voltage divider circuit with a voltage source, connections from the first and second means to the valves respectively to vary the conductivity of the valves proportionally to the voltages, and a meter connected between points in the voltage divider circuits to indicate the difference in voltages at such points.

4. A combustion gas analyzer comprising a bridge circuit including a temperature sensitive impedance over which gas to be analyzed is circulated, the bridge circuit producing a voltage proportional to the percentage of carbon dioxide minus the percentage of hydrogen in the gas, a circuit including an oxygen sensitive cell through which the gas is circulated for producing a voltage proportional to the percentage of oxygen in the gas, and a meter connected between said circuits for continuously indicating the difference in said voltages.

5. A combustion gas analyzer comprising a bridge circuit including a temperature sensitive impedance over which gas to be analyzed is circulated, the bridge circuit producing a voltage proportional to the percentage of carbon dioxide minus the percentage of hydrogen in the gas, a circuit including an oxygen sensitive cell through which the gas is circulated for producing a voltage proportional to the percentage of oxygen in the gas, a pair of voltage divider circuits each including an electrical valve, connections from the bridge circuit and the last named circuit to the valves respectively to vary the conductivity of the valves proportionally to the voltages, and a meter connected between points in the voltage divider circuits to indicate the difference between the voltages at such points.

References Cited by the Examiner
UNITED STATES PATENTS 2,428,121    9/47    Minter ------------------ 73—27

OTHER REFERENCES

Whiter: "Exhaust Gas Analysis Promotes Gasoline Engine Efficiency," Instruments, vol. 7, pages 64–66, April 1934.

RICHARD C. QUEISSER, *Primary Examiner.*